United States Patent Office 3,168,500
Patented Feb. 2, 1965

3,168,500
GELATION OF POLYACRYLAMIDE
Tzeng J. Suen, New Canaan, and Donald F. Rossler, Stamford, Conn., assignors to American Cyanamid Company, New York, N.Y., a corporation of Maine
No Drawing. Filed Nov. 25, 1960, Ser. No. 71,406
5 Claims. (Cl. 260—80.3)

The present invention relates to the gelation of polymers of acrylamide. More particularly, the present invention relates to water-insoluble polymers of acrylamide and a method for the production thereof. Still further, the present invention relates to a method for the production of water-insoluble polymers of acrylamide by heating a water-soluble polymer of acrylamide in the presence of various catalyst systems until said polymer is converted into a water-insoluble gel.

Many proposals have been made for the insolubilizing of polymers of acrylamide. For the most part, these proposals have constituted copolymerizing acrylamide with a divinyl compound such as methylene-bisacrylamide or reacting polyacrylamide with a material such as formaldehyde. These processes tend to cross-link the polymer of acrylamide and thereby render the polymer water-insoluble. No process, as far as is known, has as yet been developed wherein water-insoluble polymers of acrylamide can be prepared without the use of a cross-linking agent, except that disclosed herein.

An object of the present invention is to provide a method for the production of water-insoluble polymers of acrylamide.

Another object of the present invention is to provide water-insoluble polymers of acrylamide.

Another object of the present invention is to provide a method for the production of water-insoluble polymers of acrylamide wherein the toxicity of the polymer is negligible or nonexistent.

A further object is to provide a method for the production of water-insoluble polymers of acrylamide from water-soluble polymers of acrylamide.

Still another object of the present invention is to provide a method for the production of water-insoluble polymers of acrylamide from water-soluble polymers of acrylamide without the necessity of using a cross-linking agent.

Other objects and benefits of the present invention will be apparent to those skilled in the art from the detailed description hereinbelow.

The above and other objects of the invention may be accomplished by heating aqueous solutions of polymers of acrylamide in the presence of a free radical catalyst until said polymer is converted into a water-insoluble gel.

We have found that when polymers of acrylamide which are soluble in water are heated in aqueous solution in the presence of a water soluble free radical catalyst system, a cross-linking of the polymer occurs, resulting in the production of a water-insoluble gel.

The exact mechanics of this reaction are not specifically known but it is theorized that the free-radicals from the catalyst systems attack the alpha hydrogen atoms of the acrylamide polymer to produce free-radicals on the polymer and these polymer free-radicals recombine with each other to cross-link the polymer and produce a water-insoluble gel.

By "polymer of acrylamide" is meant any homopolymer of acrylamide or copolymer thereof with a monoethylenically unsaturated monomer copolymerizable therewith the copolymer contains at least 80% by weight based on the total weight of copolymer of acrylamide units. These polymers of acrylamide are substantially free of monomeric material. By "substantially free" is meant that no more than about 1–2% of monomer, as such, is present in the polymer of acrylamide.

The homopolymers of acrylamide which are useful as feed materials are those which are produced in any known manner, e.g., by heating acrylamide in the presence of a redox catalyst or by radiation polymerization and the like. None of these methods are now novel; many are very old; but all are applicable. The copolymers which can be used as feed materials for the instant process are those containing at least 80% acrylamide units. Examples of monomers which are copolymerizable with acrylamide and thereby form the copolymers useful in the present process are acrylonitrile, methacrylonitrile, acrylic acid, methacrylic acid, methylacrylate, ethylacrylate, butylacrylate, maleic anhydride, maleic acid and the like. Generally, any monoethylenically unsaturated monomer copolymerizable with acrylamide is satisfactory.

The homopolymers and copolymers of acrylamide, to be useful in the process of the present invention, must be in aqueous solution. That is, no dry, solid polymers can be employed as feed materials in the instant process. The concentration of the polymer of acrylamide in solution can be as low as 1% of polymer in the solvent and as high as 40% although amounts within the range of 10–35% are preferred. The concentration of the polymer in solution is dependent upon the molecular weight of the polymer. The molecular weight must be such that viscosity of the aqueous solution of polymer is not so high so as to stop the flow of solution or prevent agitation thereof. The molecular weight of the polymer should therefor be within the range of 5000 to 20 million inclusive and preferably 50,000 to 1,000,000. High molecular weight polymers necessitate the use of low solution concentrations while low molecular weight polymers enable higher solution concentrations to be used. When using polymeric materials having high molecular weights such as those that are between about 100,000 and 10,000,000, the weight average molecular weight can be determined by the light scattering method. Cf. P. J. Flory, Principles of Polymer Chemistry, Cornell University Press, 1953, pages 256–316. In determining the molecular weight of lower polymers, the osmotic pressure may be used. The following table discloses the viscosity and molecular weight relationship of acrylamide polymers.

TABLE 1

*Viscosity and molecular weight relationship of polyacrylamides in centipoises at various concentrations*

| Molecular Weight | Concentration | | | | |
|---|---|---|---|---|---|
| | 2% | 5% | 10% | 20% | 40% |
| $1 \times 10^4$ | | | | | 1,000–3,000 |
| $5 \times 10^4$ | | | | 75–200 | |
| $1 \times 10^5$ | | | 20–60 | 200–500 | |
| $5 \times 10^5$ | 10–30 | 150–400 | 5,000–15,000 | | |
| $1 \times 10^6$ | 40–100 | 1,000–2,500 | 30,000–80,000 | | |
| $3 \times 10^6$ | 800–2,000 | 20,000–50,000 | | | |

The catalyst systems which are employed herein must be water-soluble. Catalysts which are water-soluble and which are used in the instant process are those characterized as free radical-generating catalysts such as salts of persulfuric acid (i.e., ammonium persulfate, potassium persulfate), salts of percarbonic acid (such as isopropyl percarbonate), salts of perphosphonic acid, salts of sulfo peracids, hydrogen peroxide, salts of perboric acid, performic acid, peracetic acid, succinic acid peroxide [$(HOOCCH_2CH_2CO)_2O_2$], and tertiary butyl hydroperoxide [$(CH_3)_3COOH$]. Of course, many other catalysts which may be classed as water-soluble free radical-generating catalysts may also be used. The above mentioned catalysts may be used alone or in combination with various reducing agents to form the so-called redox catalysts, so long as the catalyst mixture remains water-soluble. Examples of these reducing agents are sulfites such as potassium metabisulfite, water-soluble amines such as diethanolamine and triethylene tetramine and ferrous salts such as ferrous sulfate pentahydrate. These catalytic reducing agents provide redox catalyst systems and may be used in the instant invention so long as the critical aspects thereof are maintained, i.e., they must be water-soluble.

The amount of catalyst employed in the invention is important only to the extent that a minimum amount thereof of about .5 to about .10% based on the amount of the polymer in solution must be present. More catalyst than this may be present without adversely affecting the reaction, but no reaction will occur with less than the above amount.

The temperature of the reaction, i.e., the temperature to which the water-soluble polymer of acrylamide is heated, is generally in the range of from about 45° C. to about 100° C. and preferably about 60° C. to about 90° C. If temperatures higher than 100° C. are employed, the water boils away. However, temperatures above 100° C. can be used if the reaction is carried out under pressure. At temperatures of over about 120° C. the polymer tends to cross-link by itself by reacting with other units at the amide group to evolve ammonia. This latter process is, of course, an entirely different process and produces an entirely different product since the cross-linking is effected only at the amide part of the polymer. If temperatures lower than 45° C. are used the reaction will proceed very slowly.

The pressure maintained during the process is not critical, and generally, atmospheric pressure is maintained. Higher pressure may be maintained however depending upon the temperature of the reaction.

The pH of the system during the process is not critical but generally is maintained at about 3 to about 9 and preferably 6–8, i.e., neutral. If a pH higher or lower than this range is utilized, the amide group of the polymer is hydrolyzed to a carboxyl group and the product formed is no longer a water-insoluble polymer of acrylamide.

The process is generally carried out by heating an aqueous solution of a polymer of acrylamide with a water-soluble catalyst, such as that described hereinabove, to a temperature of from about 45° C. to about 100° C. until a gel of a water-insoluble polymer of acrylamide is produced. The formation of the water-insoluble gel is evidenced either by an increase in the viscosity of the reaction mass, by the polymer of acrylamide being thrown out of solution or by the formation of a gel of infinite viscosity. Fresh catalyst can merely be added to the polymer, after the polymer has been initially produced by polymerizing the acrylamide monomer by any method, as described above. That is to say, the final water-insoluble gel may be produced from an acrylamide polymer which has been produced months before or the gel may be produced immediately after the polymerization of the acrylamide monomer by adding fresh catalyst to the recovered polymer and then following the process of the instant invention as described above. The catalyst can be used in solid form or in solution. The only prerequisite is that it is water-soluble.

The solution of the polymer of acrylamide and catalyst can be mixed and the mixture can then be heated to about 45° C. to about 100° C. or the solution of the polymer of acrylamide can be heated to the desired temperature and the catalyst added thereto. A water-insoluble gel forms in both cases. Also the catalyst can be heated and then mixed with the solution of polymer of acrylamide or the solution of polymer and catalyst can both be heated individually and then mixed. Water-insoluble gels form in these methods also. Therefore, one can see that the order of the addition of the materials is not important.

The water-insoluble polymers of acrylamide produced herein have a low toxicity and can therefore be easily handled.

As far as is known, the water-insoluble polymers of acrylamide of the instant invention are not soluble in any known organic or inorganic solvents. Of course, the polymer may be disintegrated by any known method. The water-insoluble polymers of acrylamide produced by the process of the instant invention can be used for the preparation of adhesives, soil stabilization or for treating paper, textiles, leather and the like.

The gelation time depends upon the temperature to which the reaction mass is heated as shown in the table presented hereinbelow. The most advantageous temperatures have been presented hereinabove and, as can be seen in the tables, the gelation proceeds at a faster rate the higher the temperature of the reaction mass.

10 parts of a 10% aqueous polyacrylamid solution (molecular weight 400,000) is added to each of 6 reaction vessels, each of which is maintained at 80° C. in a water bath.

Time to form gel, after addition of redox catalyst, was determined.

TABLE 2

|  | 1 | 2 | 3 | 4 | 5 | 6 |
|---|---|---|---|---|---|---|
| Conc. $K_2S_2O_8$ on PAM[1] solids (percent) | 1,000 | 500 | 200 | 100 | 50 | 25 |
| Wt. $K_2S_2O_8$ Added (parts) (in 20 parts $H_2O$) | 10 | 5 | 2 | 1 | 0.5 | 0.25 |
| Wt. $K_2S_2O_5$ Added (parts) (in 20 parts $H_2O$) | 4.1 | 2.2 | 0.82 | 0.41 | 0.23 | 0.10 |
| Time in minutes to form gel | 24 | 20 | 27 | 19 | 26 | 20 |

[1] Polyacrylamide.

10 parts of a 10% aqueous polyacrylamid solution (molecular weight 400,000) is added to each of 6 reaction vessels, each of which is maintained at 60° C. in water bath.

Time to form gel, after addition of redox catalyst, was determined.

TABLE 3

|  | 1 | 2 | 3 | 4 | 5 | 6 |
|---|---|---|---|---|---|---|
| Conc. $K_2S_2O_8$ on PAM[1] solids (percent) | 500 | 200 | 100 | 50 | 25 | 10 |
| Wt. $K_2S_2O_8$ Added (parts) (in 10 parts $H_2O$) | 5 | 2 | 1 | 0.5 | 0.25 | 0.1 |
| Wt. $K_2S_2O_5$ Added (parts) (in 10 parts $H_2O$) | 2.25 | .82 | .41 | .23 | .10 | .04 |
| Time in minutes to form gel | 253 | 201 | 143 | 115 | 139 | 280 |

[1] Polyacrylamide.

10 parts of a 10% aqueous polyacrylamid solution (molecular weight 400,000) is added to each of 6 reaction vessels each of which is maintained at 40° C. in water bath.

None of the polymer solutions gelled in 7 hours at 40° C.

On raising temperature of the water bath to 80° C. all solutions gelled.

TABLE 4

| | 1 | 2 | 3 | 4 | 5 | 6 |
|---|---|---|---|---|---|---|
| Conc. $K_2S_2O_8$ based on PAM[1] PAM[1] solids (percent) | 500 | 200 | 100 | 50 | 25 | 10 |
| Wt. $K_2S_2O_8$ Added (parts) (in 10 parts $H_2O$) | 5 | 2 | 1 | 0.5 | 0.25 | 0.1 |
| Wt. $K_2S_2O_5$ Added (parts) (in 10 parts $H_2O$) | 2.25 | .82 | .41 | .23 | .10 | .04 |
| Time in minutes to gel at 80° C. | 12 | 15 | 20 | 30 | 55 | 80 |

[1] Polyacrylamide.

The following examples are by way of illustration only and are not meant to be construed in any way as a limitation on the instant invention. All parts are parts by weight unless otherwise indicated.

Examples 1 to 11 show that gelation occurs even though the amount of catalyst used is varied considerably and also that the temperature at which the reaction is maintained effects the gelation time.

EXAMPLE 1

252 parts of an aqueous polyacrylamide solution of 9.4% polymer concentration and having a viscosity of 6000 cp. at 29° C. are mixed with a solution of 23 parts of ammonium persulfate in 50 parts of water in a suitable reaction vessel. The mixture is stirred at room temperature for about 1 hour to form a homogenous solution. The mixture is then placed in a water bath heated to 65–73° C. In 25 minutes a heavy gel forms. A 40 part sample is immersed in 200 parts of water for 2 days. It does not redissolve.

EXAMPLE 2

10 parts of a 10% polyacrylamide solution is treated with 0.25 part of potassium persulfate and 0.10 part of potassium metabisulfite which are each dissolved in 20 parts of water. In other words, the concentration of polyacrylamide in the resulting solution is 2%. The temperature is maintained at 80° C. In 15 minutes a solid water-insoluble gel forms.

EXAMPLE 3

The same procedure as in Example 2 is followed except that 0.50 part of potassium persulfate and 0.225 part of potassium metabisulfite are used as the catalyst. A solid water-insoluble gel forms in 26 minutes.

EXAMPLE 4

The same procedure as in Example 2 is followed except that 1.0 part of potassium persulfate and 0.41 part of potassium metabisulfite are used as the catalyst. A solid water-insoluble gel forms after 19 minutes.

EXAMPLE 5

Again the procedure of Example 2 is followed except that 5.0 parts of potassium persulfate and 0.82 part of potassium metabisulfite are used as the catalyst. Gelation occurs in 20 minutes.

EXAMPLE 6

The procedure of Example 2 is again followed except that 10.0 parts of potassium persulfate and 4.1 parts of potassium metabisulfie are used as the catalyst. A solid water-insoluble gel forms in 24 minutes.

EXAMPLE 7

The procedure of Example 2 is again followed except that the temperature is maintained at 60° C. instead of 80° C. and the catalyst components are each dissolved in 10 parts of water. The concentration of polyacrylamide in the resulting solution is 3.3%. 0.1 part of potassium persulfate and 0.04 part of potassium metabisulfite are used as the catalyst. Gelation occurred in 280 minutes.

EXAMPLE 8

The procedure of Example 7 is followed but 0.25 part of $K_2S_2O_8$ and 0.10 part of $K_2S_2O_5$ are used as catalyst. A solid water-insoluble gel forms in 239 minutes.

EXAMPLE 9

The procedure of Example 7 is again followed except that 0.50 part of $K_2S_2O_8$ and 0.225 part of $K_2S_2O_5$ is the catalyst used. A water-insoluble gel forms in 135 minutes.

EXAMPLE 10

The procedure of Example 7 is again closely followed except that 1.0 part of $K_2S_2O_8$ and 0.41 part of $K_2S_2O_5$ are used as the catalyst. Gelation occurs in 143 minutes.

EXAMPLE 11

The procedure of Example 7 is again utilized but 2.0 parts of $K_2S_2O_8$ and 0.82 part of $K_2S_2O_5$ are used as the catalyst. In 201 minutes gelation has occurred.

Examples 12 to 18 show some catalyst systems which may be used in the instant invention.

EXAMPLE 12

300 parts of 10% aqueous solution of polyacrylamide is heated to 80° C. in a water bath. 30 parts of $(NH_4)_2S_2O_8$ and 12.3 parts of $K_2S_2O_5$ each in 100 ml. of water were run into the solution of polymer via funnels and the temperature was maintained at 80° C. A solid gel formed in 135 minutes.

EXAMPLE 13

To 325 parts of a 10% aqueous solution of a polyacrylamide at 25° C. are added 32.5 parts of $K_2S_2O_8$ and 13.3 parts of $K_2S_2O_5$ (added as dry solids). The cold aqueous solution is then placed in an 80° C. water bath. The temperature of the solution rises to 80° C. in the course of 28 minutes and was maintained until a gel formed. Gelation occurred in 85 minutes.

EXAMPLE 14

To a suitable reaction vessel containing 100 parts of a 10% aqueous solution of polyacrylamide the following reactants are added: 36 parts of ferrous sulfate pentahydrate dissolved in 50 parts of $H_2O$, 16.7 parts of 30% hydrogen peroxide solution and 1 ml. of normal $H_2SO_4$. The solution is stirred to form a homogeneous solution and the mixture is heated in a water bath to 80° C. After 60 minutes a firm water-insoluble gel forms.

EXAMPLE 15

To 100 parts of a 10% aqueous solution of polyacrylamide is added 8.2 parts of 90% formic acid and 18.1 parts of 30% hydrogen peroxide. The solution is stirred and heated to 60° C. After 120 minutes a water-insoluble gel forms.

EXAMPLE 16

13.2 parts of glacial acetic acid and 25 parts of 30% hydrogen peroxide are added to 150 parts of 10% aqueous polyacrylamide solution. The solution is heated to 80° C. with stirring and after 75 minutes a stiff water-insoluble gel forms.

EXAMPLE 17

10 parts of succinic acid peroxide is added to 200 parts of a 10% aqueous polyacrylamide solution and heated to 70° C. After 45 minutes the reaction mass gels to a stiff water-insoluble polymer of acrylamide.

EXAMPLE 18

100 parts of a 10% aqueous solution of polyacrylamide are mixed with 5 parts of t-butyl hydroperoxide dissolved in 100 parts of $H_2O$ at 80° C. After 60 minutes a heavy water-insoluble gel forms.

Examples 19 and 20 show the formation of water-insoluble gels of acrylamide polymers wherein the feeds which are treated by the process of the instant invention are copolymers of acrylamide.

EXAMPLE 19

A solution of 1.5 parts ammonium persulfate in 50 parts water is added to 150 parts of a 10% aqueous solution of a copolymer composed of 85% acrylamide and 15% acrylic acid. The mixture is heated at 80° C. with constant stirring. A stiff water-insoluble gel forms after two hours of reaction and makes stirring almost impossible.

EXAMPLE 20

Twenty parts of a 90% acrylamide–10% acrylonitrile copolymer in 180 parts water are heated to 80° C. and treated with 10 parts of 30% hydrogen peroxide and 25 parts of $FeSO_4 \cdot 7H_2O$ in 75 parts water. After 1¾ hours a viscous water-insoluble gel forms.

We claim:

1. A process which comprises heating an aqueous solution of a water-soluble polymer of acrylamide which is substantially free from monomeric material with a water-soluble, free radical catalyst at a temperature of from about 45° C. to about 100° C. until said polymer is converted into a water-insoluble gel.

2. A process according to claim 1 wherein the catalyst is a redox catalyst.

3. A process according to claim 2 wherein the catalyst is a mixture of potassium persulfate and potassium metabisulfite.

4. A process according to claim 1 wherein the polymer is an acrylamide copolymer containing at least 80% acrylamide units, the remainder being a monoethylenically unsaturated monomer copolymerizable with acrylamide.

5. A cross-linked, water-insoluble homopolymer of acrylamide.

References Cited in the file of this patent

UNITED STATES PATENTS

| | | |
|---|---|---|
| 2,442,330 | Fuller | June 1, 1948 |
| 2,486,192 | Minsk et al. | Oct. 25, 1949 |
| 2,628,214 | Pinkney et al. | Feb. 10, 1953 |
| 2,820,777 | Suen et al. | Jan. 21, 1958 |
| 2,870,128 | Sellers | Jan. 20, 1959 |
| 2,901,468 | Meinel | Aug. 25, 1959 |
| 2,960,486 | Pye | Nov. 15, 1960 |
| 3,075,956 | Shields et al. | Jan. 29, 1963 |

FOREIGN PATENTS

| | | |
|---|---|---|
| 646,714 | Great Britain | Nov. 29, 1950 |

OTHER REFERENCES

Krczil: "Kurzes Handbuch der Polymerizationstechnik," vol. 1, Akademische Verlagsgesellschaft Becker and Erler Kom.-Ges; Germany, 1940, page 719.

UNITED STATES PATENT OFFICE
CERTIFICATE OF CORRECTION

Patent No. 3,168,500                                February 2, 1965

Tzeng J. Suen et al.

It is hereby certified that error appears in the above numbered patent requiring correction and that the said Letters Patent should read as corrected below.

Column 4, TABLE 3, under the column heading 5, line 4 thereof, for "139" read -- 239 --; column 5, line 60, for "metabisulfie" read -- metabisulfite --.

Signed and sealed this 21st day of September 1965.

(SEAL)
Attest:

ERNEST W. SWIDER                               EDWARD J. BRENNER
Attesting Officer                                      Commissioner of Patents